United States Patent [19]

Moses

[11] Patent Number: 5,168,400
[45] Date of Patent: Dec. 1, 1992

[54] LASER PULSE STACKING METHOD

[75] Inventor: Edward I. Moses, Livermore, Calif.

[73] Assignee: United States Department of Energy, Washington, D.C.

[21] Appl. No.: 336,450

[22] Filed: Mar. 15, 1989

Related U.S. Application Data

[63] Continuation of Ser. No. 915,199, Sep. 29, 1986, abandoned.

[51] Int. Cl.$^5$ .............................................. H01S 3/101
[52] U.S. Cl. ......................................... 359/333; 372/25; 372/30
[58] Field of Search ......................... 372/25, 30; 330/4.3

[56] References Cited

U.S. PATENT DOCUMENTS

| | | | |
|---|---|---|---|
| 3,747,019 | 7/1973 | Koechner et al. | 372/30 |
| 3,764,936 | 10/1973 | Baues | 372/30 |
| 4,250,466 | 2/1981 | Jernigan et al. | 372/25 X |
| 4,264,869 | 4/1981 | Hunter | 330/4.3 |
| 4,345,212 | 8/1982 | Seppala et al. | 330/4.3 |

OTHER PUBLICATIONS

"Large Bore Copper-Vapor Lasers: Kinetics and Scaling Issues", Kushner and Warner, J. Appl. Phys. 54(6) 1983.

*Primary Examiner*—Mark Hellner
*Attorney, Agent, or Firm*—Miguel A. Valdes; Henry P. Sartorio; William R. Moser

[57] ABSTRACT

A laser pulse stacking method is disclosed. A problem with the prior art has been the generation of a series of laser beam pulses where the outer and inner regions of the beams are generated so as to form radially non-synchronous pulses. Such pulses thus have a non-uniform cross-sectional area with respect to the outer and inner edges of the pulses. The present invention provides a solution by combining the temporally non-uniform pulses in a stacking effect to thus provide a more uniform temporal synchronism over the beam diameter.

2 Claims, 1 Drawing Sheet

LASER PULSE STACKING METHOD

FIELD OF THE INVENTION

The United States Government has rights in this invention pursuant to Contract No. W-7405-ENG-48 between the United States Department of Energy and the University of California for operation under Lawrence Livermore National Laboratory.

This is a continuation of application Ser. No. 915,199 filed Sep. 29, 1986, abandoned Apr. 21, 1989.

BACKGROUND OF THE INVENTION

The present invention relates to a laser pulse stacking method for use, as an example, in an atomic vapor laser isotope separation (AVLIS) process.

An AVLIS process is an isotope enrichment process which involves the use of generation of laser beam pulses having a certain pulse repetition rate or frequency of operation (e.g., 5 KHz or higher) to photo-ionize an atomic vapor (typically uranium) to separate a particular isotope, such as U235, from other isotopes in the vapor.

The uranium enrichment process generally requires use of copper vapor laser beam pulses which desirably have the same temporal relationship between the center and outside edges of the beam cross-section.

A problem in the prior art has been the generation of such laser beam pulses where this temporal relationship is such that the outer edge of the pulse arrives sooner than the control core. This occurs because of the fact that the electrical skin effect of the laser discharge retards the laser excitation at the center of the beam, so that the resulting laser beam pulse is generated as an annular ring early in time. Later, the entire cross-section lases. Finally, only the core region lases, causing a radially shrinking pencil beam. This effect can have undesirable consequences, particularly where a series of laser pulses are desired to be in time synchronization, such as for use in an AVLIS process, as described above. A visualization of this effect yields a chevron shaped figure on a plot of beam radium versus time.

SUMMARY OF THE INVENTION

It is an object of the present invention to provide a laser pulse stacking method.

It is a more particular object of the present invention to provide a laser pulse stacking method which minimizes the effect of chevron-shaped radius versus time plot.

Additional objects, advantages and novel features of the present invention will be set forth in part in the description which follows and in part become apparent to those skilled in the art upon examination of the following, or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings, which are incorporated in and form a part of this specification, illustrate an embodiment of the invention and, together with the following detailed description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with that preferred embodiment, it will be understood that it is not intended to limit the invention to one preferred embodiment. On the contrary, it is intended to cover alternatives, modifications and equivalents a may be included within the spirit and scope of the invention as defined by the appended claims.

Figure 1:
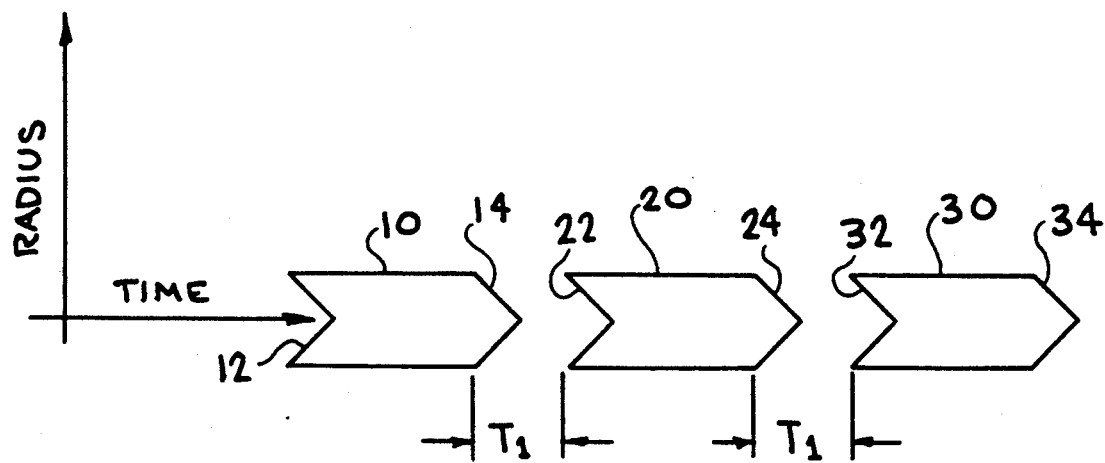
FIG. 1 depicts a diagram illustrating prior art laser beam pulses which have the chevron-shaped effect.

Referring now to FIG. 1, a series of laser beam pulses 10, 20, 30 are depicted in which the laser pulses 10, 20, 30 have their outer and inner zones in the form of a chevron-shaped figure on a plot of beam radius versus time. There is a time period $T_1$ between each of the pulses 10, 20, 30. As previously described, a problem in the prior art has been the generation of laser beam pulses where the outer and inner edges of the pulses are generated so as to form these chevron-shaped pulses depicted in FIG. 1.

For example, pulse 10 in FIG. 1 has its outer edge 14 and inner edge 12 in the shape of a chevron. Similarly, pulses 20 and 30 have the same shape.

These phenomena occur because of the skin effect inherent in the laser discharge, which have the effect such that a longitudinally applied electric field penetrates radially inward in time, so that the resulting laser beam does not simultaneously lase over its whole cross-sectional area, particularly with respect to the outer and inner regions of the pulse.

Figure 2:
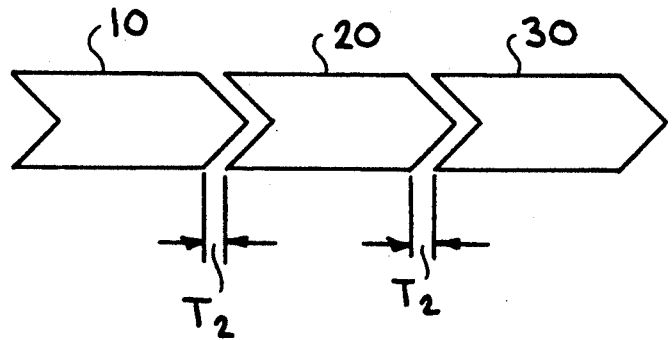
FIG. 2 depicts a method according to the present invention to overcome the effect of chevron-shaped pulses of FIG. 1.

Referring now to FIG. 2, the method according to the present invention to overcome the effect of chevron-shaped pulses is depicted. The present invention provides a solution to the chevron-shaped pulses by stacking the resulting chevron-shaped pulses through suitable means, such as suitable optics and/or delay means (not shown). As seen in FIG. 2, with suitable delay means, pulses 10, 20, 30 can be stacked so that the time $T_2$ between pulses is minimized, as contrasted with time delay $T_2$ in FIG. 1.

The time delay $T_1$ in FIG. 1, in combination with the generation of series of the laser beam pulses 10, 20, 30, is an undesirable aspect in the AVLIS process.

In FIG. 2, the time delay $T_2$ is providing what can be characterized as a stacking effect, and it can be seen in FIG. 2 that the resulting waveform is effectively a more uniform wave shape.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments, and with various msdifications as are suited to the particular use contemplated. It is intended that the scope of the invention be defined only by the claims appended hereto.

What is claimed is:

1. In a laser pulse generation system where a series of laser beam pulses are generated in a laser discharge tube by application of a longitudinal electric field to said discharge tube where said electric field penetrates radially inward with respect to time and where each pulse generated has a temporal delay between the beam edge and center so as to be in the form of a chevron-shaped pulse such that the resulting laser beams do not simultaneously lase over their respective cross-sectional areas, the method comprising the steps of combining said pulses so as to form a resulting beam having an increased temporal uniformity wherein the time between each of said temporally non-uniform pulses is of a first duration and further including the step of stacking said pulses including delaying subsequent ones of said series of pulses so as to form a resulting beam having said improved temporal waveshape uniformity where the time between each pulse is of a second duration and where the duration is a shorter duration than said first duration.

2. In an atomic vapor laser isotope separation process including a laser pulse generation system for use in photo-ionizing the atomic vapor where a series of laser beam pulses are generated in a laser discharge tube by application of a longitudinal electric field to said discharge tube where said electric field penetrates radially inward with respect to time and where each pulse generated has temporal delay from the beam edge to its center so as to be in the form of a chevron-shaped pulse such that the resulting laser beams do not simultaneously lase over their respective cross-sectional areas, the method comprising the steps of combining the temporally-shaped pulses so as to form a resulting beam having improved temporal waveshape uniformity wherein the time between each of said temporally non-uniform pulses is of a first duration and further including the step of stacking said pulses including delaying subsequent ones of said series of pulses so as to form a resulting beam having said improved temporal waveshape uniformity where the time between each pulse is of a second duration and where the duration is a shorter duration than said first duration.

* * * * *